United States Patent
Thackeray et al.

(10) Patent No.: US 7,846,585 B2
(45) Date of Patent: Dec. 7, 2010

(54) SILVER MANGANESE VANADIUM OXIDE ELECTRODES FOR LITHIUM BATTERIES

(75) Inventors: Michael M. Thackeray, Naperville, IL (US); John T. Vaughey, Elmhurst, IL (US)

(73) Assignee: UChicago Argonne, LLC, Chicago, IL (US)

( * ) Notice: Subject to any disclaimer, the term of this patent is extended or adjusted under 35 U.S.C. 154(b) by 318 days.

(21) Appl. No.: 12/215,083

(22) Filed: Jun. 25, 2008

(65) Prior Publication Data

US 2009/0004565 A1 Jan. 1, 2009

Related U.S. Application Data

(60) Provisional application No. 60/937,654, filed on Jun. 29, 2007.

(51) Int. Cl.
| | |
|---|---|
| *H01M 4/54* | (2006.01) |
| *H01M 4/50* | (2006.01) |
| *H01M 4/48* | (2006.01) |
| *H01M 4/26* | (2006.01) |

(52) U.S. Cl. ............ 429/219; 429/224; 429/231.5; 423/599

(58) Field of Classification Search ............ 429/219
See application file for complete search history.

(56) References Cited

U.S. PATENT DOCUMENTS

| | | | |
|---|---|---|---|
| 4,310,609 A | 1/1982 | Liang et al. | |
| 4,391,729 A | 7/1983 | Liang et al. | |
| 5,955,218 A * | 9/1999 | Crespi et al. | 429/219 |
| 7,041,414 B2 | 5/2006 | Thackeray et al. | |
| 2002/0081493 A1* | 6/2002 | Leising et al. | 429/219 |
| 2004/0048156 A1* | 3/2004 | Thackeray et al. | 429/219 |
| 2004/0091779 A1* | 5/2004 | Kang et al. | 429/231.1 |

OTHER PUBLICATIONS

Thackeray, Michael M. et al., Advances in Manganese-Oxide Composite Electrodes for Lithium-Ion Batteries, J. Mater. Chem., 2005, 15, 2257-2267.

Thackeray, Michael M. et al. Li2MnO3-Stabilized LiMO2 (M=Mn, Ni, Co) Electrodes for Lithium-Ion Batteries, J. Mater. Chem., 2007, 17, 3112-3125.

* cited by examiner

*Primary Examiner*—Patrick Ryan
*Assistant Examiner*—Brent Thomas
(74) *Attorney, Agent, or Firm*—Olson & Cepuritis, Ltd.

(57) ABSTRACT

This invention relates to electrodes for non-aqueous lithium cells and batteries. More specifically, the invention relates to silver manganese vanadium oxide positive electrodes for such cells and batteries. The silver manganese vanadium oxide electrodes may contain substituents or dopants to improve the electrochemical properties of the electrodes, cells and batteries. The silver manganese vanadium oxide electrodes optionally contain silver powder and/or silver foil to assist in current collection at the electrodes and to improve the power capability of the cells or batteries. The invention also includes a method for preparing the electrodes by decomposition of a permanganate salt, such as $AgMnO_4$, $KMnO_4$, $NaMnO_4$ or $LiMnO_4$ in the presence of a compound or compounds containing silver and/or vanadium.

11 Claims, 7 Drawing Sheets

SILVER MANGANESE VANADIUM OXIDE ELECTRODES FOR LITHIUM BATTERIES

RELATED APPLICATION

This application claims the benefit under Title 35, United States Code 19(e) of U.S. Provisional Application Ser. No. 60/937,654 filed Jun. 29, 2007

CONTRACTUAL ORIGIN OF THE INVENTION

The United States Government has rights in this invention pursuant to Contract No. W-31-109-ENG-38 between the United States Government and The University of Chicago and/or pursuant to Contract No. DE-AC02-06CH11357 between the United States Government and UChicago Argonne, LLC representing Argonne National Laboratory.

FIELD OF INVENTION

This invention relates to electrochemical cells and batteries and more particularly to improved positive electrode materials for non-aqueous lithium cells and batteries. The predominant, but not exclusive, field of use of these electrodes is for primary (non-rechargeable) lithium batteries with particular emphasis on powering medical devices such as cardiac pacemakers, defibrillators and medical pumps.

BACKGROUND OF THE INVENTION

State-of-the-art cardiac defibrillators are powered by lithium batteries in conjunction with electrolytic capacitors. The batteries contain a metallic lithium negative electrode, a silver-vanadium oxide positive electrode and a non-aqueous liquid electrolyte consisting of a lithium salt such as $LiAsF_6$ dissolved in an organic solvent, such as propylene carbonate. Silver vanadium oxide electrodes are well known in general for lithium batteries, as described in U.S. Pat. No. 4,310,609 and U.S. Pat. No. 4,391,729 that disclose the use of an electrochemical cell having as its positive electrode a composite oxide matrix consisting of a vanadium oxide chemically reacted with a group IB, IIB, IIIB, IVB, VB, VIIB, VIIB and VIII metal, and most specifically with a silver containing compound. U.S. Pat. No. 4,391,729 also discloses a method of making such a cathode. The current positive electrode of choice is $Ag_2V_4O_{11}$. $Li/Ag_2V_4O_{11}$ cells discharge by an electrochemical process that involves lithium insertion into the crystal lattice of $Ag_2V_4O_{11}$ with a simultaneous reduction of the silver ions and their concomitant extrusion from the crystal lattice; thereafter, lithium insertion is accompanied by a concomitant reduction of the vanadium ions within the structure, ideally from $V^{5+}$ to $V^{4+}$. Thus the reaction can be broadly defined in the ideal case as taking place in main two steps:

$Li + Ag_2V_4O_{11} \rightarrow Li_2V_4O_{11} + 2Ag$  (Step 1: Silver displacement)

$xLi + Li_2V_4O_{11} \rightarrow Li_{2+x}V_4O_{11}$ $(x_{max} \approx 5)$  (Step 2: Lithium insertion)

One of the major limitations of $Li/Ag_2V_4O_{11}$ cells is that they lose their capability of providing the necessary power particularly after the reaction described in Step 1 has occurred, and when cells are allowed to stand for prolonged periods of time. It is believed that this loss in power may be attributed, at least in part, to the $Ag_2V_4O_{11}$ positive electrode, and in particular, that it may be attributed to the fact that at the end of Step 1, a metastable phase of composition $Li_2V_4O_{11}$ is formed. This metastability is supported by the fact that it has not been possible to synthesize a $Li_2V_4O_{11}$ phase that is isostructural with $Ag_2V_4O_{11}$ by independent chemical methods in the laboratory. Attempts to synthesize a "$Li_2V_4O_{11}$" phase in the laboratory, for example, by reacting $Ag_2V_4O_{11}$ with n-butyllithium, have failed; these attempts have always yielded other stable lithium-vanadium-oxide phases such as $LiVO_3$ and $LiV_3O_8$. This finding indicates that the power fade may at least be partly attributed to a decay of the metastable "$Li_2V_4O_{11}$" phase that is generated electrochemically during Step 1 into other more stable lithium-vanadium-oxide compounds.

$Li/Ag_2V_4O_{11}$ lithium cells deteriorate prematurely and are unable to deliver acceptable pulse power before the cells have reached the end of their expected calendar (shelf) and operating life. It is understood that such limitations of $Li/Ag_2V_4O_{11}$ cells are of great concern when used to power implantable devices such as cardiac defibrillators in the human body. Such limitations negatively affect product reliability and necessitate a continual monitoring of the cells while implanted in patients to ensure a timely replacement before they prematurely reach the end of discharge.

There is therefore a great need to improve the electrochemical properties and operating life of silver-vanadium-oxide electrodes for lithium cells and batteries, particularly for use in life-supporting medical devices. In this respect, silver manganese oxide $Ag_xMnO_y$ electrodes derived from silver permanganate precursors have already been fabricated and disclosed in U.S. Pat. No. 7,041,414, the entire disclosure of which is incorporated by reference. We have now discovered that by using a combination of manganese and vanadium together with the silver component of the metal oxide electrodes, it is possible to significantly increase the capacity of the electrodes and hence the energy density of the lithium cells and batteries in which they are employed.

SUMMARY OF THE INVENTION

This invention relates to electrodes for non-aqueous lithium cells and batteries. More specifically, the invention relates to silver manganese vanadium oxide positive electrodes. The silver manganese vanadium oxide electrodes optionally contain silver powder and/or silver foil to assist in current collection at the electrodes and to improve the power capability of the cells or batteries. The invention relates also to a method for preparing the electrodes by decomposition of a permanganate salt, such as $AgMnO_4$, $KMnO_4$ or $LiMnO_4$ in the presence of a compound or compounds containing silver and/or vanadium. The invention also includes silver manganese vanadium oxide electrodes that contain substituents, such as copper, or other components such as metal oxides to improve the electrochemical properties of the electrodes, cells and batteries.

Accordingly, an object of the present invention is to provide a positive electrode for a non-aqueous lithium electrochemical cell, comprising a silver-manganese-vanadium oxide compound having the general formula $Ag_xMn_aV_bO_z$ in which the values of x, a, and b are greater than or equal to one, the maximum value of z is determined by the oxidation state of the silver ions having a maximum value of two, the oxidation state of the manganese ions having a maximum value of four, and the oxidation state of the vanadium ions having a maximum value of five.

Another object of the invention is to provide a positive electrode for a non-aqueous lithium electrochemical cell, comprising a silver-manganese-vanadium oxide compound substantially amorphous to X-rays having the general formula $Ag_xMn_aV_bO_z$ in which the values of x, a, and b are greater than or equal to one, the maximum value of z is less than or equal to 8.5 and is determined by the oxidation state of the silver ions having a maximum value of two, the oxidation state of the manganese ions having a maximum value of four, and the oxidation state of the vanadium ions having a maximum value of five.

BRIEF DESCRIPTION OF THE DRAWINGS

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

DESCRIPTION OF THE PREFERRED EMBODIMENTS

State-of-the-art lithium batteries that are used for cardiac pacemaker applications commonly use iodine (in the form of polyvinylpyrrolidone (PVP)/$I_2$) as the positive electrode, whereas the most common positive electrode for defibrillators is silver vanadium oxide, $Ag_2V_4O_{11}$ (SVO); a less common positive electrode for medical lithium batteries is heat-treated gamma-$MnO_2$. It is known that lithium cells with SVO electrodes decay on standing over a period of time and once they are discharged to approximately 2.6 V vs. metallic lithium an increase in cell impedance can damage the performance of the lithium cells. Such a limitation is a major disadvantage when cells are implanted into the human body and surgery is required to replace the batteries. The exact reason for the decay in the performance of Li/SVO cells is presently unknown. It has been proposed that the decay of Li/SVO cells and the impedance rise is at least partly associated with the instability of a lithiated silver vanadium oxide electrode structure.

This invention addresses the need for finding more stable positive electrodes to replace SVO in medical lithium batteries. It relates specifically to silver manganese vanadium oxide electrodes.

In a first embodiment, the invention relates to a positive electrode for a non-aqueous lithium electrochemical cell, the electrode being comprised of a silver manganese vanadium oxide compound having the general formula $Ag_xMn_aV_bO_z$ in which the values of x, a, and b are greater than or equal to one, the maximum value of z being determined by the oxidation states of the silver ions having a maximum oxidation state of two, the manganese ions having a maximum oxidation state of four, and the vanadium ions having a maximum oxidation state of 5. The silver manganese vanadium oxide electrodes may be discrete compounds or they may be comprised of a mixture of compounds or one or more structurally-integrated composite compounds. The compounds may be amorphous to X-rays or they may be more crystalline to X-rays.

In general, the formula of such compounds can be represented by $Ag_xMn_aV_bO_z$ in which the values of x, a, and b are each greater than or equal to one with the value of z being dependent on the oxidation states of silver having a maximum oxidation state of two, manganese having a maximum oxidation state of four, and vanadium having a maximum oxidation state of 5. Examples of such compounds with divalent silver are: $AgMnVO_{5.5}$ (x=a=b=1; z=5.5), $Ag_2MnVO_{6.5}$ (x=2; a=b=1; z=6.5), $Ag_3MnVO_{7.5}$ (x=3, a=b=1, z=7.5), and $Ag_2Mn_2VO_{8.5}$ (x=2, a=2; b=1, z=8.5). It is anticipated, however, that in most practical situations, the oxidation state of the silver ions lies between one and two. If the silver ions were monovalent, then the corresponding formulae for the four compounds would be $AgMnVO_{5.0}$, $Ag_2MnVO_{5.5}$, $Ag_3MnVO_{6.0}$, and $Ag_2Mn_2VO_{7.5}$ with z values of 5.0, 5.5, 6.0, and 7.5, respectively.

In a second embodiment, the silver manganese vanadium oxide electrodes may consist of a compound or a composite matrix of materials, optionally in the presence of silver powder or a silver foil current collecting medium, in addition to other possible electronically conducting, current collecting species such as graphite or other forms of carbon. Specifically, it is believed that the silver powder can act as nucleating sites for the silver metal that is extruded from the silver manganese vanadium oxide electrodes during discharge, thereby enhancing the current collection at the electrode and the power capability of the cell. Alternatively, when laminated electrodes are used, silver foil can be used as the current collector onto which the electrochemically active silver manganese vanadium oxide electrode powder is cast.

In a third embodiment, the silver manganese vanadium oxide electrodes may be stabilized by small amounts of cation or anion substituents, typically less than 20 atom % preferably about 10 atom % to about 0.5 atom % of the cations or anions, to improve the structural and/or electrochemical properties of the electrode. Cation substitutents in metal oxide electrodes for lithium batteries are typically selected from Li, Mg, Al, or first or second row transition metal ions such as Ti or Zr, whereas F is often used as an anion substituent. For example, it is well known in the art that the electrochemical properties of $LiMn_2O_4$ can be significantly improved by lithium substitution for manganese to yield more stable $Li_{1+x}Mn_{2-x}O_4$ electrode compounds, and that substitution of cobalt by nickel in $LiCo_{1-x}Ni_xO_2$ increases the electrochemical capacity of the electrode. For the electrodes of the present invention, for example, copper can be incorporated into the electrode structure by using copper-containing precursors to form copper-silver-manganese-vanadium-oxide electrodes, such as $Ag_{2-x}Cu_xMn_2VO_3$ in which the copper can also contribute to electrode capacity during discharge and to electronic conductivity when it is extruded as metallic copper from the oxide particles. It is also known in the prior art, as taught by Thackeray et al. in the Journal of Materials Chemistry, Volume 15, pages 2257-2267 (2005) and Volume 17, pages 3112-3125 (2007) that structurally-integrated compounds such as those found in the $xLi_2MnO_3 \cdot (1-x)LiMO_2$ (M=Mn, Ni, Co) system can be used effectively to stabilize conventional $LiMO_2$ electrodes, and to use relatively high concentrations of manganese such as in the compound $0.3Li_2MnO_3 \cdot 0.7LiMn_{0.5}Ni_{0.5}O_2$ in which the Mn comprises 28.3% of the metal cations to achieve high electrode capacities. This invention therefore includes substituted silver-manganese-vanadium-oxide electrodes and structurally integrated silver-manganese-vanadium-oxide electrodes.

In a fourth embodiment, a method is disclosed whereby the silver manganese vanadium oxide electrodes of the invention may be prepared by the decomposition of a permanganate precursor in the presence of one or more silver components or compounds, one or more vanadium components or compounds, optionally in the presence of one or more manganese components or compounds, and/or one or more cation or anion substituents and/or other components or compounds, such as other metal oxide components or compounds that help to improve the structural stability and electrochemical performance of the electrodes, cells and batteries. Examples of such other components or compounds are molybdenum oxides, tungsten oxides, titanium oxides, zirconium oxides and aluminum oxides. For the synthesis of the silver-manganese-vanadium-oxide electrodes of the present invention, the permanganate precursor is preferably silver permanganate, $AgMnO_4$, which contains both silver and permanganate components. When permanganate precursors other than, or including, $AgMnO_4$ are used, the decomposition occurs in the presence of silver and vanadium components or compounds to introduce silver and vanadium into the resulting silver manganese vanadium oxide electrode product. For example, the permanganate precursor may be preferably selected from lithium permanganate, $LiMnO_4$; sodium permanganate, $NaMnO_4$; and potassium permanganate, $KMnO_4$, with $LiMnO_4$ being the most preferred and the silver compound may be selected preferably from silver nitrate, $AgNO_3$, a silver oxide, such as but not limited to $Ag_2O$, whereas the vanadium precursor may preferably be selected from $VO(SO_4).xH_2O$, $NH_4(VO_3)$ or $V_2O_5$. Although the above-mentioned precursors are selected as preferred permanganate-, silver- and vanadium precursors, it will be appreciated by those skilled in the art that other permanganate-, silver- and vanadium precursors could be used to prepare the silver manganese vanadium oxide electrodes. In addition, other manganese precursors, such as manganese oxides, hydroxides, carbonates and the like, may be included to control the amount of manganese in the final product. The advantage of using precursors of permanganate, silver nitrate, and $VO(SO_4).xH_2O$ and $NH_4(VO_3)$ is that they all decompose during synthesis of the inventive electrode material to yield compounds that are amorphous to X-rays.

Discharge of Li/silver manganese vanadium oxide cells is believed to occur by a similar two-stage mechanism that characterizes conventional $Li/Ag_2V_4O_{11}$ cells. During the first step of the reaction, the silver ions are reduced to silver metal, and during the second stage the vanadium and manganese ions are reduced, typically from a pentavalent and tetravalent state, respectively, towards a trivalent state, or lower.

The negative electrodes of the electrochemical cells of the present invention may be selected from any suitable lithium-containing compound known in the art, for example, metallic lithium, lithium alloys, lithium intermetallic compounds and lithiated carbon, such as lithiated graphite $Li_xC_6$ in which x can reach a typical value of 1. Preferably, the negative electrode is metallic lithium. Likewise, the non-aqueous electrolyte may be selected from any suitable electrolyte salts, solvents and additives that are known in the art. Examples of well known salts are $LiClO_4$, $LiAsF_6$, $LiPF_6$, $LiBF_4$ and $LiB(C_2O_4)_2$, whereas typical electrolyte solvents are propylene carbonate, ethylene carbonate, diethyl carbonate, dimethyl carbonate, diethyl ether, dimethoxyethane and the like, and typical electrolyte additives are vinyl ethylene carbonate, lithium bis-oxalato borate ($LiB(C_2O_4)_2$) and fluorinated derivatives.

EXPERIMENTAL

The principles of this invention are demonstrated but not limited by the following examples.

Synthesis and Preparation of Electrode Materials

Silver manganese vanadium oxide electrode materials were synthesized using two different vanadium sources:

Example 1

Synthesis Technique 1

Figure 1:
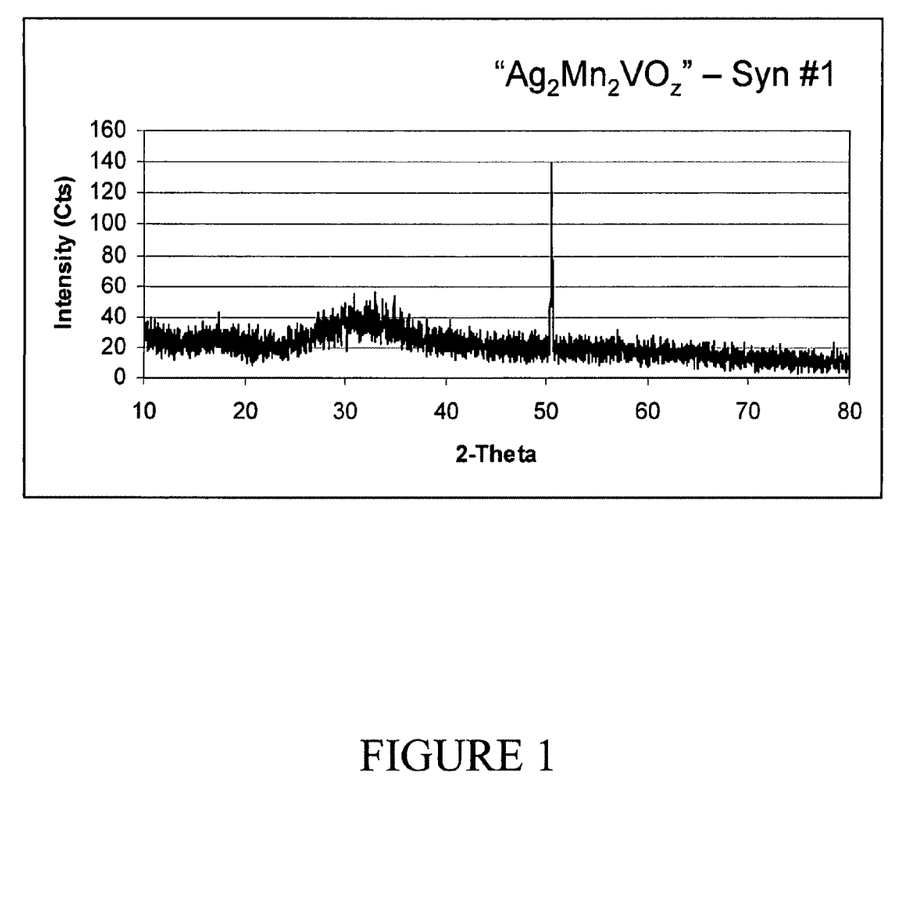
FIG. 1 depicts the X-ray diffraction pattern of $Ag_2Mn_2VO_z$ as prepared by synthesis technique 1.

$AgMnO_4$ and $VO(SO_4).xH_2O$ in which the Ag:Mn:V ratio was 2:2:1 were mixed and dissolved in water from which a precipitate was formed and filtered. The product was dried at 25° C. in air for 8 hours. The X-ray diffraction pattern of the $Ag_2Mn_2VO_x$ product, which is essentially amorphous to X-rays is shown in FIG. 1.

Example 2

Synthesis Technique 2

Figure 2:
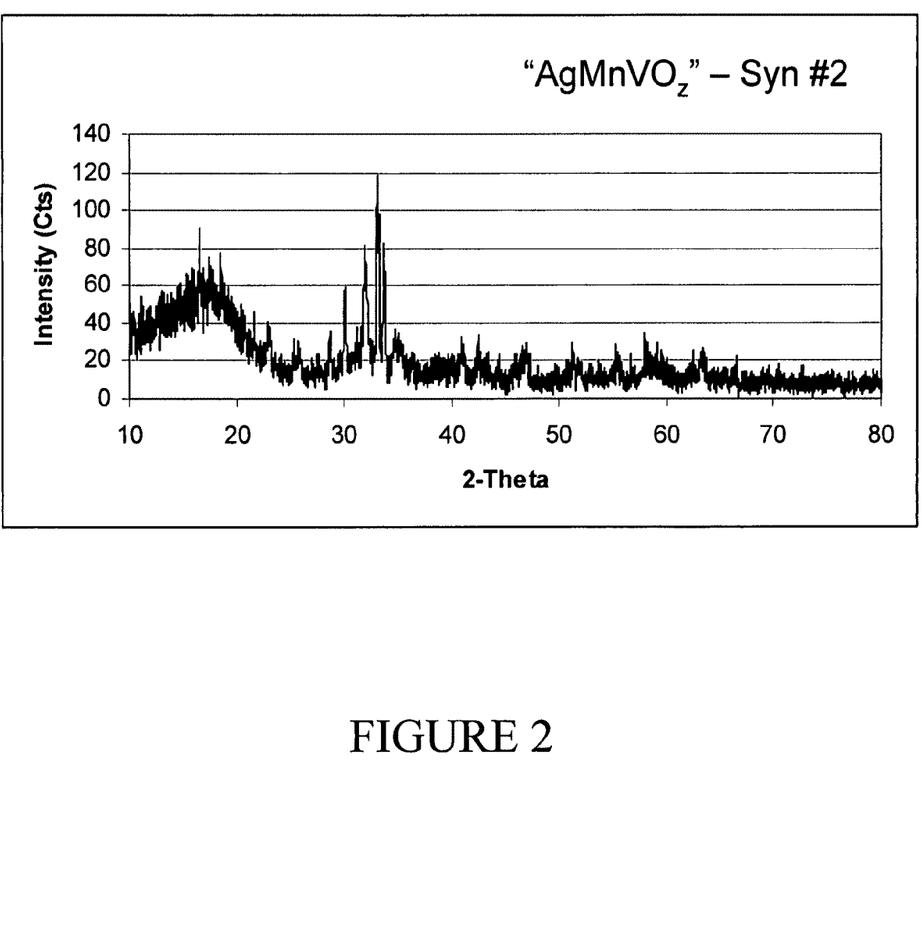
FIG. 2 depicts the X-ray diffraction pattern of $AgMnVO_z$ as prepared by synthesis technique 2.
Figure 3:
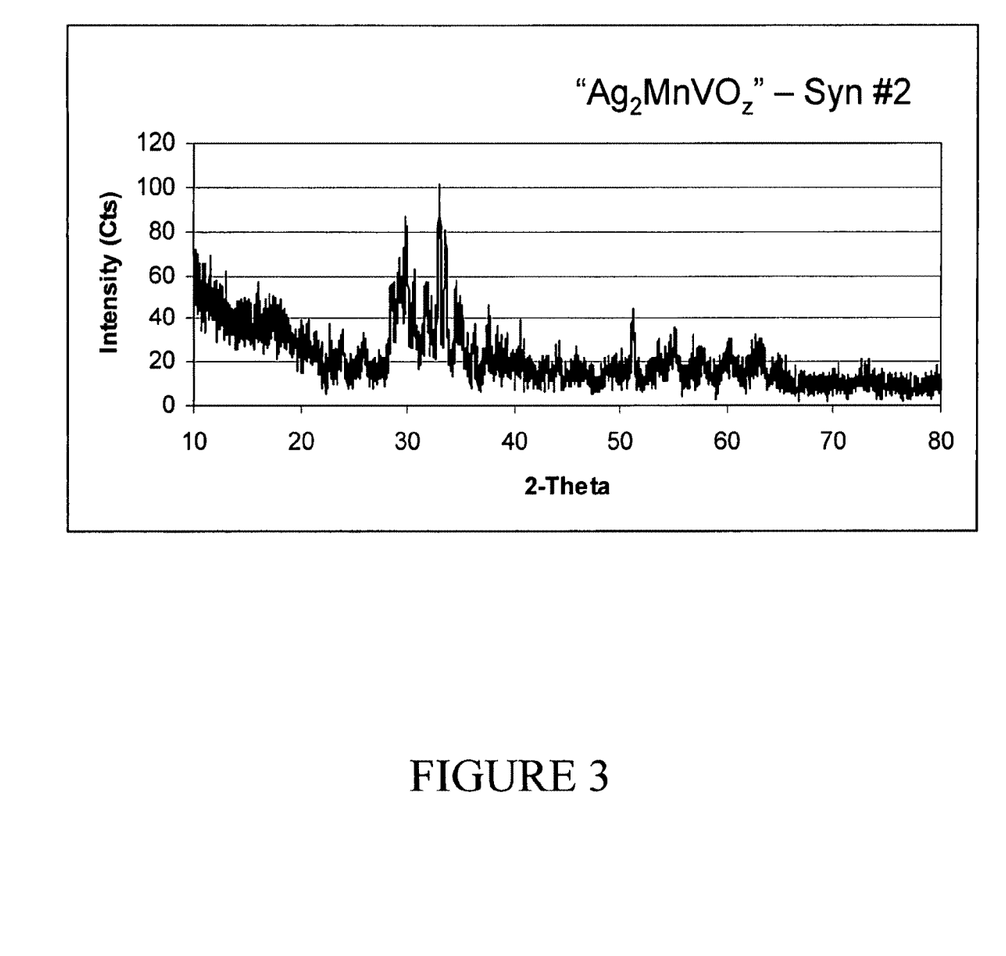
FIG. 3 depicts the X-ray diffraction pattern of $Ag_2MnVO_z$ as prepared by synthesis technique 2.

$AgMnO_4$, $AgNO_3$ and $NH_4VO_3$ were mixed and dissolved in water and evaporated to dryness. The product was ground, dried at 300° C. in air for 48 hours and reground. The X-ray diffraction patterns of two typical products, $AgMnVO_z$ and $Ag_2MnVO_z$ in which the Ag:Mn:V ratio was 1:1:1 and 2:1:1 are shown in FIGS. 2 and 3, respectively, are indicative of products more crystalline to X-rays than Example 1.

In order to evaluate the electrochemical properties of the silver-manganese-vanadium-oxide electrode compounds as a function of silver content, four silver-manganese-vanadium-oxide compounds in which the Ag:Mn:V ratio was varied from 1:1:1, 2:1:1, 3:1:1 and 4:1:1, were synthesized from the precursors specified in Synthesis Technique 2. For these four syntheses, the $AgMnO_4$, $AgNO_3$ and $NH_4VO_3$ precursor materials were dissolved in water and sonicated for 30 minutes. The mixtures were dried slowly while being stirred over a 3-day period. The resulting powders were decomposed and reacted at 300° C. for one day. The X-ray diffraction patterns of these materials, like those in FIGS. 2 and 3, were indicative of more crystalline products than the product of Example 1, and were typical of multi-component products that were difficult to identify unequivocally.

Electrochemical Evaluation

In general, the lithium cells were fabricated as follows. Positive electrode laminates were made by the following general procedure. The active electrode powders were sifted to <40 μm, mixed with 8 w/o carbon (acetylene black and SFG6 graphite in a 50:50 ratio by mass) and 8 w/o polyvinylidine difluoride (PVDF) binder and cast onto an Al foil with NMP N-methylpyrrolidone dilutant. The cast laminate was subsequently dried at 70° C., and placed into a vacuum oven overnight. Coin cells of size 2032 (2.0 cm diameter, 3.2 mm high) were used for the electrochemical evaluations. The positive electrode consisted of a 1.6 cm diameter disc, punched from the laminate; a disc of metallic lithium, punched from lithium foil served as the negative electrode. Electrodes were insulated from one another by a porous polypropylene (Celgard) separator. The electrolyte was 1 M $LiPF_6$ dissolved in a 50:50 mixture of EC (ethylene carbonate) and dimethylcarbonate (DMC)]. The electrochemical data were collected under constant current (approximately 0.06 mA/cm²) to a final discharge voltage of 1.0 V.

Example 3

Figure 4:
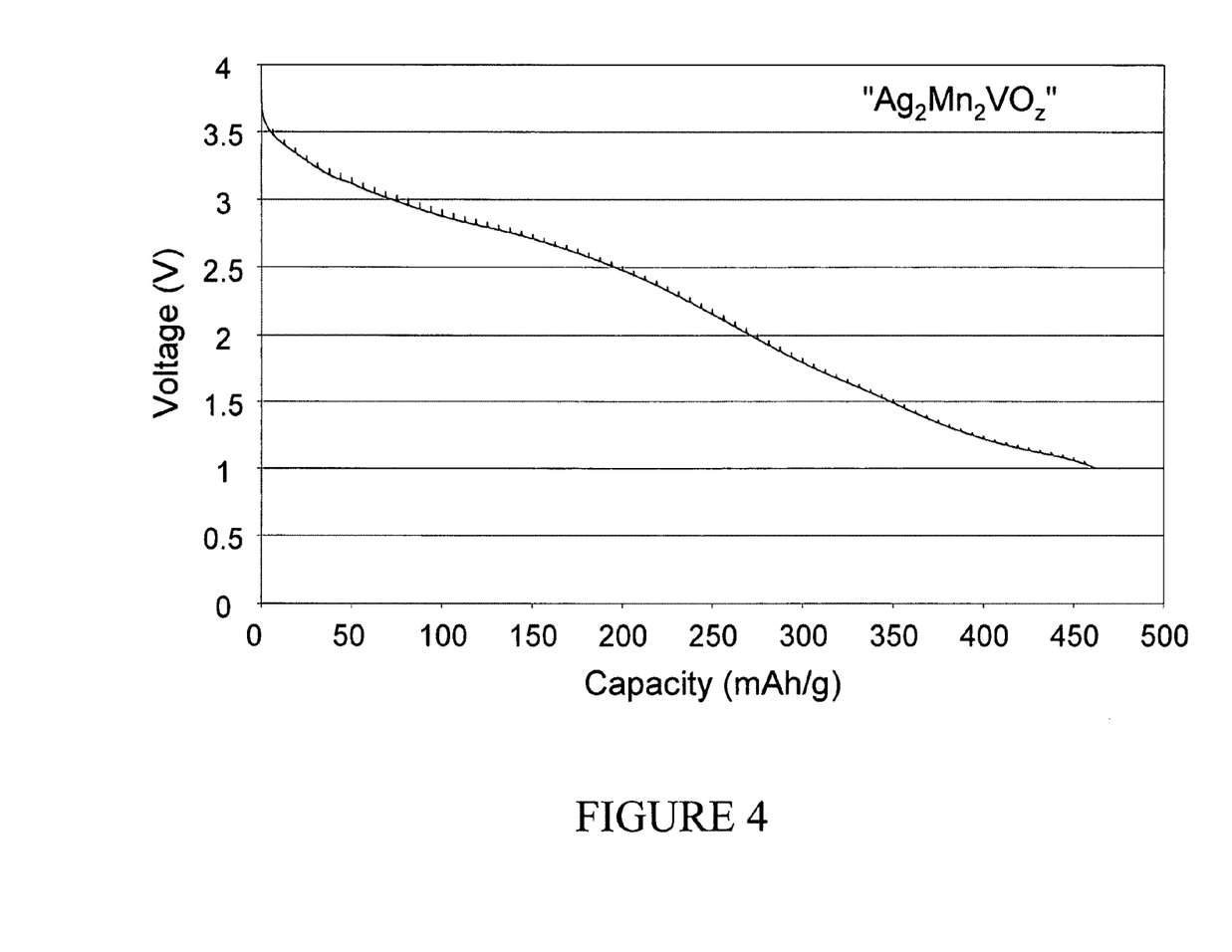
FIG. 4 depicts the electrochemical profile for the discharge of a Li/$Ag_2Mn_2VO_z$ cell in which the $Ag_2Mn_2VO_z$ electrode was prepared by synthesis technique 1.

The electrochemical discharge profile of a lithium/silver manganese vanadium oxide electrochemical cell containing the $Ag_2Mn_2VO_z$ electrode of Example 1 in which the value of z, assuming divalent silver, is 8.5 and, assuming monovalent silver, is 7.5 is shown in FIG. 4. The $Ag_2Mn_2VO_z$ electrode delivered a significantly high electrode capacity of 462 mAh/g between 3.6 and 1.0 volt vs. metallic lithium, thereby demonstrating the utility of the invention.

Example 4

The electrochemical profiles of the four lithium cells containing the four silver-manganese-vanadium oxide cathode materials with Ag:Mn:V ratios varying from 1:1:1 to 4:1:1, as described above were similar to that of Example 1 in FIG. 4. In general, the capacity delivered by the electrodes more crystalline to X-rays, made according to synthesis technique 2 was inferior (337–190 mAh/g) to the capacity delivered by the electrode essentially amorphous to X-rays, made according to synthesis technique 1 of Example 1 (462 mAh/g). Of particular note is the unexpected discovery that the silver-manganese-vanadium oxide electrodes of Example 3 with a Ag:Mn:V ratio of 2:2:1 delivered approximately 300 mAh/g when discharged to 1.7 volts vs. metallic lithium (which is significantly higher than the $Ag_xMnO_y$ electrodes disclosed in U.S. Pat. No. 7,041,414, that provided at best a capacity of 230 mAh/g, when discharged to 1.7 volts vs. metallic lithium under pulse/relaxation (open circuit conditions)), and 462 mAh/g when discharged to 1.0 volts vs. metallic lithium.

Figure 5:
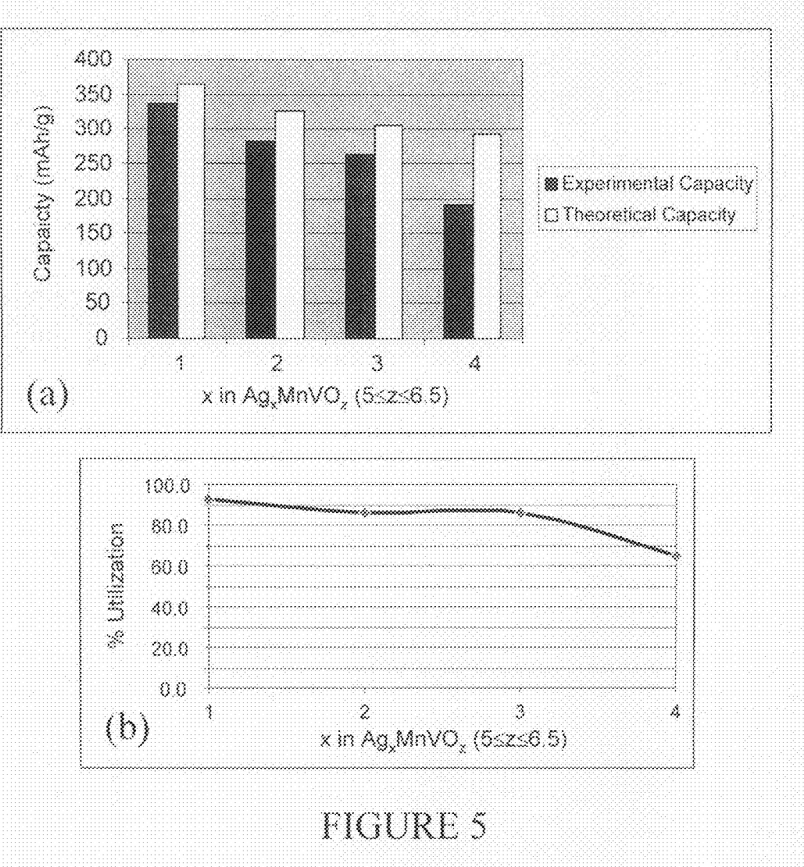
FIG. 5 depicts (a) a plot of experimental and theoretical capacities as a function of the silver content (x) of four '$Ag_xMnVO_z$' electrodes and (b) a plot of percent electrode utilization vs. silver content (x) of the same four electrodes.

The data showed that the capacity of the electrodes more crystalline to X-rays was strongly dependent on the Ag content of the electrode, those electrodes with lower Ag content, delivering the higher capacities, as illustrated in FIGS. 5a and 5b. The theoretical capacity of each electrode was calculated assuming complete reduction of monovalent silver to the metallic state, reduction of tetravalent manganese to the trivalent state, and reduction of pentavalent vanadium to the trivalent state. On this basis, the overall formulae of the four electrode compounds were anticipated to be approximately '$AgMnVO_5$', '$Ag_2MnVO_{5.5}$', '$Ag_3MnVO_6$' and '$Ag_4MnVO_{6.5}$', with theoretical gravimetric capacities of 365, 327, 306 and 293 mAh/g, respectively, indicating that from a gravimetric capacity standpoint, those electrode materials with a lower silver component would be more favorable. However, from a volumetric capacity standpoint, the reverse is true, because increasing the concentration of silver in the electrode increases the density of the electrode materials content because silver has the highest density of all the components in the electrode (10.49 gm/ml). A plot of experimental and theoretical gravimetric capacities as a function of Ag content (x) in the four '$AgMnVO_5$', '$Ag_2MnVO_{5.5}$', '$Ag_3MnVO_6$' and '$Ag_4MnVO_{6.5}$' materials (i.e., $1 \leq x \leq 4$, $5 \leq z \leq 6.5$) shows that the experimentally-observed capacity falls off sharply for the high silver content electrode ('$Ag_4MnVO_{6.5}$') (FIG. 5a), as reflected also in FIG. 5b by a plot of electrode utilization as a function of Ag content (x) in the $Ag_x(MnV)O_z$ materials. These results clearly illustrate that the Ag:Mn:V:O ratio in the electrodes of the present invention can be tailored to achieve optimized gravimetric and volumetric electrode capacities, and consequently also optimized gravimetric and volumetric energy densities of the lithium cells and batteries.

Figure 6:
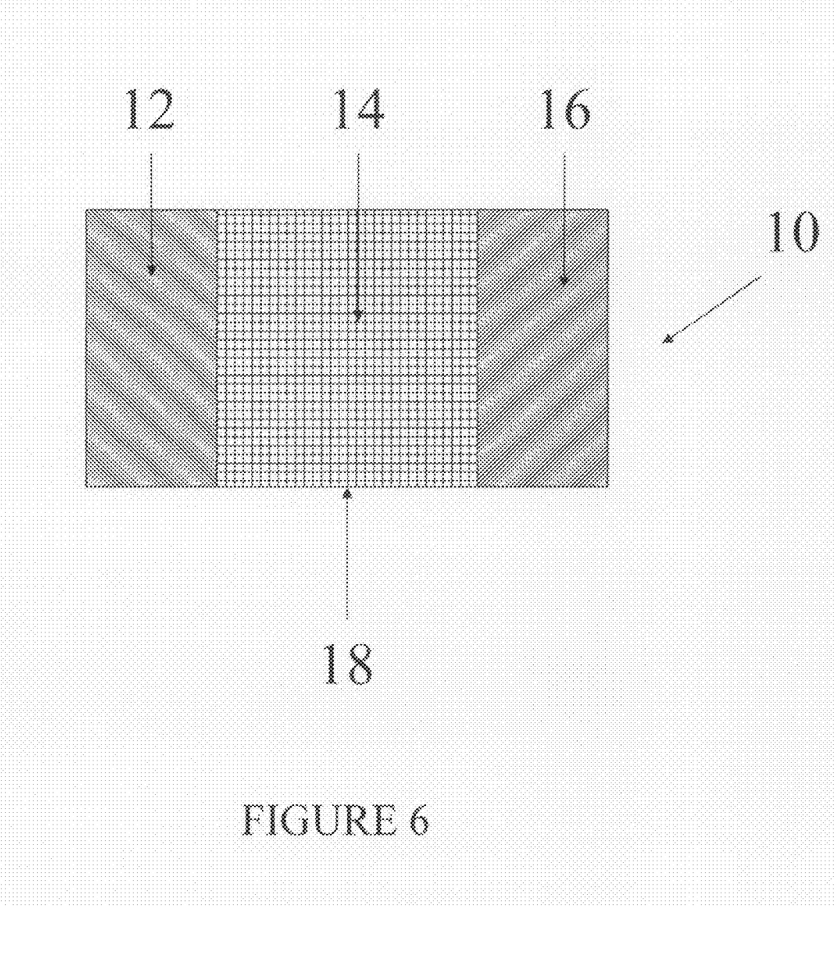
FIG. 6 depicts a schematic illustration of an electrochemical cell.
Figure 7:
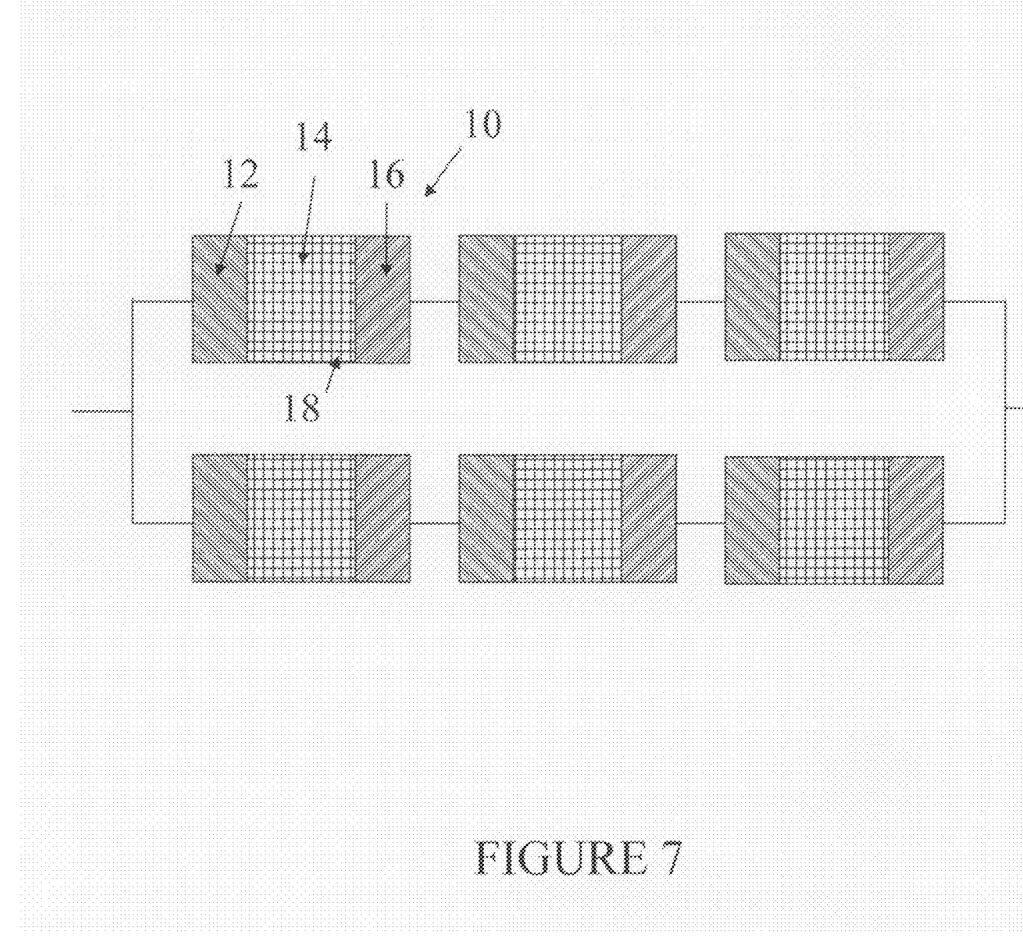
FIG. 7 depicts a schematic illustration of an example of a battery employing the cells of the invention.

This invention, therefore, relates to a positive electrode for a non-aqueous electrochemical lithium cell, as shown schematically in FIG. 6, the cell represented by the numeral 10 having a negative electrode 12 separated from a positive electrode 16 by an electrolyte 14, all contained in an insulating housing 18 with suitable terminals (not shown) being provided in electronic contact with the negative electrode 12 and the positive electrode 16. Binders and other materials normally associated with both the electrolyte and the negative and positive electrodes are well known in the art and are not described herein, but are included as is understood by those of ordinary skill in this art. FIG. 7 shows a schematic illustration of one example of a battery in which two strings of electrochemical lithium cells, described above, are arranged in parallel, each string comprising three cells arranged in series.

While particular embodiments of the present invention have been shown and described, it will be appreciated by those skilled in the art that changes, modifications and improvements may be made, for example in the processing of the materials or in the electrode and/or cell design without departing from the true spirit and scope of the invention.

The embodiments of the invention in which an exclusive property or privilege is claimed are defined as follows:

1. A positive electrode for a non-aqueous lithium electrochemical cell, comprising a silver-manganese-vanadium oxide compound substantially amorphous to X-rays having the general formula $Ag_xMn_aV_bO_z$ in which the values of x, a, and b are greater than or equal to one, the maximum value of z is less than or equal to 8.5 and is determined by the oxidation state of the silver ions having a maximum value of two, the oxidation state of the manganese ions having a maximum value of four, and the oxidation state of the vanadium ions having a maximum value of five.

2. The positive electrode of claim 1, wherein the capacity is greater than about 400 mAh/g when discharged to 1.0 volts.

3. The positive electrode of claim 1, wherein the capacity is greater than about 450 mAh/g when discharged to 1.0 volts.

4. The positive electrode of claim 1, and further including Ag as powder or foil and/or cation or anion substituents present up to about 20 atom %.

5. The positive electrode of claim 4, wherein the cation substituents are selected from Li, Mg, Al, or first or second row transition metals.

6. The positive electrode of claim 4, wherein the anion substituent is F.

7. The positive electrode of claim 4, wherein Cu is substituted for some of the Ag.

8. A non-aqueous electrochemical cell having a positive electrode of claim 4, and a negative electrode containing Li or a compound thereof and an electrolyte containing a Li salt.

9. A battery of a plurality of electrochemical cells of claim 8 connected in parallel or series.

10. A method whereby the positive electrode of claim 1 is prepared by the decomposition of a permanganate precursor in the presence of one or more silver components or compounds, one or more vanadium components or compounds, optionally in the presence of one or more manganese components or compounds, and/or one or more cation or anion substituents and/or metal oxide components or compounds.

11. The method according to claim 10, in which the permanganate precursor is selected from one or more of $AgMnO_4$, $KMnO_4$, $NaMnO_4$ and $LiMnO_4$.

* * * * *